H. A. H. SALOMO.
DIFFERENTIAL GEARING.
APPLICATION FILED NOV. 27, 1908.
959,394.
Patented May 24, 1910.
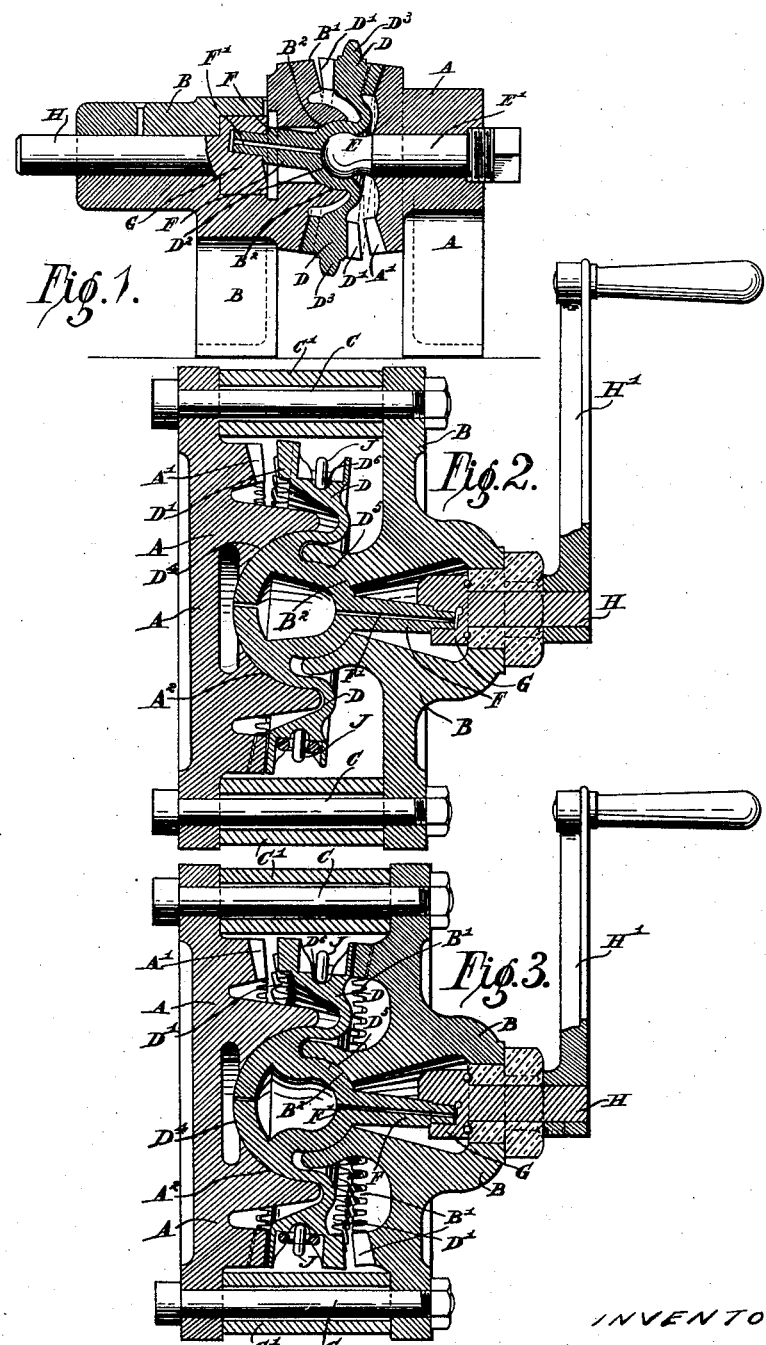

UNITED STATES PATENT OFFICE.

HENRY AUGUST HUGO SALOMO, OF MELBOURNE, VICTORIA, AUSTRALIA.

DIFFERENTIAL GEARING.

959,394.  Specification of Letters Patent.  Patented May 24, 1910.

Application filed November 27, 1908. Serial No. 464,589.

*To all whom it may concern:*

Be it known that I, HENRY AUGUST HUGO SALOMO, citizen of the State of Victoria, Commonwealth of Australia, residing at 278 Little Lonsdale street, Melbourne, in the State of Victoria, Commonwealth of Australia, have invented new and useful Improvements in Differential Gearing, of which the following is a specification.

This invention relates to an improved speed reducing or multiplying gearing and refers to certain improved means of obtaining increased power, applicable for many different purposes such as power hoists, winches, steering gearing, drawing benches and the like, where increased power is required at the expense of time or vice versa, increased speed at the expense of power.

The object of my invention is to provide an improved gearing of simple construction, having a minimum number of working parts and in which any differentiation of power may be obtained within limits, applicable for many different purposes as already mentioned. I accomplish this object by means of gearing consisting of an oscillating wheel mounted in ball and socket bearings having a series of teeth engaging a stationary series of teeth of corresponding shape but differing in number, the said oscillating wheel having means on its periphery for transmitting its rotary motion. The oscillating or rocking movement of the wheel having greater number of teeth is effected by means of a crank, or eccentric, having such a throw that one-half of the teeth or more of the moving oscillating wheel may clear the points of the stationary teeth. By the oscillating or rocking motion of the outer moving wheel each revolution of the crank or eccentric causes it to rotate one tooth (when the difference in the number of teeth is to that extent). This oscillating or rocking wheel is formed with a groove to accommodate a chain or other means to enable it to transmit the rotary motion imparted.

In order that my invention may be the better understood I will now proceed to describe the same with reference to the accompanying drawings in which:—

Figure 1 is a side sectional elevation of a gearing for reducing speed giving increased power being more particularly applicable for reducing the speed of motors such as electro-motors. Fig. 2 is a side sectional elevation of a gearing applicable more particularly for a hoist, the meshing of the teeth being upon one side only of the oscillating wheel. Fig. 3 is a side sectional elevation of a similar gearing to Fig. 2, the meshing of the teeth being upon both sides of the oscillating wheel.

The supporting bracket is preferably formed in two parts; a back part or cheek A, and a front part or cheek B which may be mounted on a bed-plate as in Fig. 1, or be connected together by tie-bolts C having distance sleeves C', as in Figs. 2 and 3. The inner or back part or cheek A is formed with a series of teeth A' radiating from the center forming a stationary toothed wheel. Similarly the front part or cheek B may be formed with a series of teeth B' radiating from the center also forming another stationary toothed wheel as shown in Figs. 1 and 3. Upon the stationary toothed wheel A' (Fig. 2) or between the two stationary toothed wheels A' and B' (Figs. 1 and 3) is arranged an oscillating wheel D. This oscillating or rocking wheel D is formed with two series of teeth D' corresponding in shape with the teeth A' and B' of the stationary wheels but being one, two, or more additional in number. It will be seen that the wheels are conical with the inclined faces opposite each other and that the relative inclines may be varied to suit circumstances.

In Fig. 1 the wheel D is formed with a central socket $D^2$ which bears upon a knob or spherical projection E on an adjustable screw pin E' mounted in the cheek A forming a ball and socket bearing. The cheek B is formed with a socket $B^2$ which bears upon the other side of the oscillating wheel D. The center of the ball and socket bearing is the central point of the oscillation of the wheel D. By this formation of ball and socket bearing for the wheel D it will be seen that the wheel D is somewhat corrugated in cross section producing great strength with lightness, while the bearing surface is greatly increased. On its outer face the wheel D is provided with a projecting spindle F which engages an eccentric or crank G upon the driving shaft H which is mounted in bearings in the bracket or cheek B. The oscillating wheel D is formed with a series of sprocket teeth $D^3$ on its outer periphery or other means for transmitting its rotary motion. The recess within which the spindle F and eccentric G are situated may be provided with covers so that it may be filled with oil. The spindle F may be drilled with an oil passage F' by which lubricant is delivered to the ball and socket bearing. The throw of the eccentric or crank G is such that the oscillation or rocking motion imparted to the wheel D is slightly greater than the depth of the teeth A' and B', so that the teeth of the wheel D may be able to just clear the teeth A' and B' upon one side while they are in engagement on the other side, as shown. Thus as the wheel D oscillates for each revolution of the eccentric or crank G it rotates one tooth, when the teeth E' are one more in number than each series of teeth A' and B'.

In Figs. 2 and 3 the ball and socket bearings for the oscillating wheel D are shown reversed. In these constructions the oscillating wheel D is formed in the center with a ball having concentric faces $D^4$ and $D^5$, the latter being of less radius than the former. The face $D^5$ bears in a socket $B^2$ in the cheek B, while the face $D^4$ bears in a socket $A^2$ in the cheek A. The center of the wheel D is preferably cored out as shown. The center of these bearing faces $D^4$ and $D^5$ is in the line of the longitudinal axis of the wheel. By this construction of ball and socket bearing the load upon the wheel D is carried by two faces—that is to say, the lower half of $D^4$ and the lower half of $D^5$, providing thereby a large bearing surface for the load with a minimum of friction and wear. This construction of the wheel D brings about the corrugated form in cross section similar to that in Fig. 1 providing strength with lightness.

In both the modifications of Figs. 2 and 3 the oscillating wheel D is provided with a projecting spindle F engaging an eccentric G mounted upon the driving shaft H which is shown with a crank-handle H' for operating it.

In Fig. 2 the oscillating wheel D is shown with teeth D' upon one side only engaging corresponding teeth A' on the cheek A.

In Fig. 3 the oscillating wheel D is shown with teeth D' upon both sides engaging corresponding teeth A' and B' on the cheeks A and B respectively. The teeth A' and B' correspond in number but differ from the teeth D' by one, two, or more teeth, the preferable difference being one tooth.

In Figs. 2 and 3 the rotary motion of the wheel D is transmitted by means of an ordinary chain J such as those used in hoists and the like and for this purpose the outer periphery of the wheel D is formed with a series of recesses $D^6$ adapted to engage the said chain J. This chain J is adapted to pass over the sleeves C' upon the tie-bolts C so that it is constantly kept in place. Obviously the gearing may be reversed for increased speed at the expense of power by making the oscillating wheel D the driver and the eccentric G and shaft H the driven members.

In the above construction it will be seen that the rotary motion is transmitted from the oscillating wheel which works in double ball and socket bearings, providing thereby a very efficient and compact gearing capable of many variations in speed and of cheap and simple construction.

I claim—

1. A speed varying gearing comprising an oscillating wheel, a ball and socket bearing for said wheel, a projecting spindle on said wheel, a crank connected with said spindle for actuating the wheel, said oscillating wheel being provided with a series of teeth, a stationary part having a series of teeth thereon of corresponding depth but different in number from the teeth on the wheel, and means on the periphery of the wheel for transmitting its rotary motion.

2. A speed varying gearing comprising an oscillating wheel, said wheel having a socket upon one side, a fixed sphere engaging said socket, said wheel having a concentric face on its other side, a part having a fixed socket with which said face engages, said fixed part being provided with teeth and said wheel being provided with teeth engaging with the teeth on said fixed part, and means on the periphery of the wheel for transmitting its rotary motion.

3. A speed varying gearing comprising an oscillating wheel, a double ball and socket bearing for said wheel, a fixed part having teeth thereon, said wheel having teeth thereon engaging with the before mentioned teeth, and means on the periphery of the wheel for transmitting its rotary motion.

4. A speed varying gearing comprising an oscillating toothed wheel of corrugated form in cross section and provided with teeth, stationary parts having teeth thereon engaging with the teeth on the wheel, and means on the outer periphery of the wheel for transmitting its rotary motion.

In testimony whereof I have signed my name to this specification in the presence of two subscribing witnesses.

HENRY AUGUST HUGO SALOMO.

Witnesses:
 CLEM A. HACK,
 EDGAR L. ROSMAN.